(12) United States Patent
Ghahreman et al.

(10) Patent No.: US 12,338,510 B2
(45) Date of Patent: Jun. 24, 2025

(54) LITHIUM RECOVERY AND PURIFICATION

(71) Applicants: XPS EXPERT PROCESS SOLUTIONS—GLENCORE CANADA CORPORATION, Falconbridge (CA); AG HYDROMETALLURGY SERVICES INC., Kingston (CA); FRONTIER LITHIUM INC., Val Caron (CA)

(72) Inventors: Ahmad Ghahreman, Kingston (CA); Graeme Goodall, Sudbury (CA); Rajan Pandher, Sudbury (CA)

(73) Assignees: XPS EXPERT PROCESS SOLUTIONS—GLENCORE CANADA CORPORATION, Falconbridge (CA); AG HYDROMETALLURGY SERVICES INC., Kingston (CA); FRONTIER LITHIUM INC., Val Caron (CA)

( * ) Notice: Subject to any disclaimer, the term of this patent is extended or adjusted under 35 U.S.C. 154(b) by 943 days.

(21) Appl. No.: 17/309,610

(22) PCT Filed: Dec. 12, 2019

(86) PCT No.: PCT/CA2019/051790
§ 371 (c)(1),
(2) Date: Jun. 10, 2021

(87) PCT Pub. No.: WO2020/118436
PCT Pub. Date: Jun. 18, 2020

(65) Prior Publication Data
US 2022/0064757 A1    Mar. 3, 2022

Related U.S. Application Data

(60) Provisional application No. 62/778,530, filed on Dec. 12, 2018.

(51) Int. Cl.
C22B 7/00    (2006.01)
C22B 26/12   (2006.01)
(Continued)

(52) U.S. Cl.
CPC .............. *C22B 7/007* (2013.01); *C22B 26/12* (2013.01); *H01M 4/405* (2013.01); *H01M 10/0525* (2013.01); *H01M 10/54* (2013.01)

(58) Field of Classification Search
None
See application file for complete search history.

(56) References Cited

U.S. PATENT DOCUMENTS 3,017,243 A    1/1962   Archambault
3,653,829 A    4/1972   Gelblum
(Continued)

FOREIGN PATENT DOCUMENTS

AR    088259 A1    5/2021
AR    074079 A1    12/2022
(Continued)

OTHER PUBLICATIONS

Supplementary European Search Report in respect of EP19895527.0, Aug. 31, 2022.
(Continued)

*Primary Examiner* — Anthony M Liang
(74) *Attorney, Agent, or Firm* — Lavery, de Billy, L.L.P.; S. Serge Shahinian (57) ABSTRACT

Processes for the recovery or purification of lithium species from various sources are described. Such sources include natural sources or deposits, such as in mining applications, and synthetic or non-natural sources, such as in the recycling of lithium species from batteries. In embodiments, the process comprises treating a $Li_2SO_4$-comprising aqueous solution with one or more barium salts to form a precipitate
(Continued)

comprising barium sulfate ($BaSO_4$). In embodiments, the processes may further comprise the preparation of a lithium sulfate-containing solution via treatment of the starting material or mixture with sulfuric acid. In embodiments, further treatments may be performed, for example prior to and/or subsequent to treatment with one or more barium salts, for example for initial or further sulfate removal, and/or removal of other metal species that may be present. The recovered lithium species be used directly, or converted into other forms, for use in a variety of applications.

11 Claims, 4 Drawing Sheets

(51) Int. Cl.
*H01M 4/40* (2006.01)
*H01M 10/0525* (2010.01)
*H01M 10/54* (2006.01)

(56) References Cited

U.S. PATENT DOCUMENTS

| | | | |
|---|---|---|---|
| 3,840,365 | A | 10/1974 | Hammes et al. |
| 3,914,163 | A | 10/1975 | Drinkard et al. |
| 3,957,601 | A | 5/1976 | Drinkard et al. |
| 3,967,957 | A | 7/1976 | Fonseca et al. |
| 6,921,522 | B2 | 7/2005 | Boryta et al. |
| 2010/0255308 | A1 | 10/2010 | Vogler et al. |

FOREIGN PATENT DOCUMENTS

| | | |
|---|---|---|
| CA | 2677817 | 8/2016 |
| CN | 1229059 A | 9/1999 |
| CN | 103318925 A | 9/2013 |
| CN | 104495880 A | 4/2015 |
| CN | 106745097 A | 5/2017 |
| CN | 107032372 A2 | 8/2017 |
| CN | 107937733 A | 4/2018 |
| CN | 104787784 A | 7/2022 |
| JP | 2003027151 A | 1/2003 |

OTHER PUBLICATIONS

Office Action in respect of AR20190103618, Nov. 24, 2022.
Machine translation of Office Action in respect of AR20190103618, Nov. 24, 2022.
Office Action in respect of CN201980087078.2, Nov. 2, 2022.
Machine translation of Office Action in respect of CN201980087078. 2, Nov. 2, 2022.
Nguyen, TH and Lee, MS, "A Review on the Separation of Lithium Ion from Leach Liquors of Primary and Secondary Resources by Solvent Extraction with Commercial Extractants", Processes 55: 1-15 (2018).
International Search Report in respect of PCT/CA2019/051790 dated Jun. 18, 2020.
Written Opinion in respect of PCT/CA2019/051790 dated Jun. 15, 2021.
International Preliminary Report on Patentability in respect of PCT/CA2019/051790 dated Jun. 18, 2020.

LITHIUM RECOVERY AND PURIFICATION

CROSS REFERENCE TO RELATED APPLICATIONS

This application claims priority of U.S. provisional application Ser. No. 62/778,530 filed on Dec. 12, 2018, which is incorporated herein by reference in its entirety.

FIELD OF THE DISCLOSURE

The present disclosure relates to the recovery and purification of metal species. More specifically, the present disclosure relates to the recovery or purification of lithium (Li) species from various sources.

BACKGROUND OF THE DISCLOSURE

The demand for lithium metal has increased exponentially over the years as it is used in various materials, including ceramic glass, adhesive, lubricants, metal alloys, and in particular electrode materials for lithium-ion batteries. Lithium is present in several natural resources including ores, clays, brines and sea water, and may be extracted therefrom. Also, it has become more and more important to recover lithium from electrode material of recycled batteries. Processes for lithium extraction/recovery are known in the art and include for example pyrometallurgical and hydrometallurgical processes, the latter including for example leaching, solvent extraction, ion exchange and precipitation (reviewed in for example Nguyen TH. And Lee MS (2018), *Processes* 55:1-15). Drawbacks include for example issues of efficiency, level of purity obtained, scale and cost. There is thus a need for novel processes for lithium recovery or purification.

SUMMARY OF THE DISCLOSURE

The present disclosure relates to the recovery and purification of metal species. More specifically, the present disclosure relates to the recovery or purification of lithium (Li) species from various sources. Disclosed herein is the design and study of processes for recovering lithium (Li) species from a mixture.

More specifically, in accordance with aspects of the present disclosure, there are provided the following items:

1. A process for recovering lithium species from an aqueous solution comprising lithium sulfate ($Li_2SO_4$), the process comprising:
   treating the $Li_2SO_4$-comprising aqueous solution with one or more barium salts to form a precipitate comprising barium sulfate ($BaSO_4$); and
   recovering the lithium species from the solution remaining after $BaSO_4$ precipitation, wherein the aqueous solution comprising lithium sulfate ($Li_2SO_4$) is derived from a natural source or mineral deposit comprising lithium species or from a synthetic or non-natural source comprising lithium species.
2. The process of item 1, wherein the lithium species is recovered in the form of lithium hydroxide (LiOH) or a hydrate thereof.
3. The process of item 1 or 2, wherein the aqueous solution comprising lithium sulfate ($Li_2SO_4$) is derived from a natural source or mineral deposit comprising lithium species.
4. The process of any one of items 1 to 3, wherein the natural source or mineral deposit comprising lithium species is an ore, clay or brine.
5. The process of any one of items 1 to 4, wherein the natural source or mineral deposit comprising lithium species is not a sulfide ore body.
6. The process of item 4 or 5, wherein the ore or clay comprises lepidolite, hectorite, jaderite, spodumene, petalite and/or amblygonite.
7. The process of item 4 or 5, wherein the brine comprises continental brine, geothermal brine and/or oilfield brine.
8. The process of item 1 or 2, wherein the aqueous solution comprising lithium sulfate ($Li_2SO_4$) is derived from a synthetic or non-natural source comprising lithium species.
9. The process of item 7, wherein the synthetic or non-natural source comprising lithium species comprises materials produced during recycling of lithium-ion batteries or other lithium bearing materials.
10. The process of item 8, wherein the materials produced during recycling of lithium-ion batteries comprise lithium-ion battery electrode material.
11. The process of item 9 or 10, wherein the materials produced during recycling of lithium-ion batteries and/or lithium-ion battery electrode material comprises lithium cobalt oxide, lithium manganese oxide, lithium iron phosphate, and/or lithium nickel manganese cobalt oxide.
12. The process of any one of items 1 to 11, further comprising producing the $Li_2SO_4$-comprising aqueous solution via treatment of a metal-comprising mixture with sulfuric acid ($H_2SO_4$).
13. The process of item 12, wherein the metal comprising mixture is the natural source or mineral deposit comprising lithium species or the synthetic or non-natural source comprising lithium species, or is a derivative of the natural source or mineral deposit comprising lithium species or the synthetic or non-natural source comprising lithium species.
14. The process of item 12 or 13, wherein the metal comprising mixture comprises lithium species in the form of lithium oxide ($Li_2O$).
15. The process of any one of items 1 to 14, wherein the one or more barium salts is barium hydroxide ($Ba(OH)_2$), barium oxide (BaO), or a combination thereof.
16. The process of any one of items 1 to 15, further comprising treating the $Li_2SO_4$-comprising aqueous solution with one or more calcium salts to form a precipitate comprising calcium sulfate ($CaSO_4$).
17. The process of item 16, wherein the treatment with one or more calcium salts is prior to treatment with the one or more barium salts and the solution remaining after $CaSO_4$ precipitation is treated with the one or more barium salts to form the precipitate comprising $BaSO_4$.
18. The process of any one of items 1 to 17, wherein the $Li_2SO_4$-comprising aqueous solution has a pH of about 4.0 or less.
19. The process of item 18, wherein the $Li_2SO_4$-comprising aqueous solution has a pH of about 2.0 to about 3.0.
20. The process of any one of items 1 to 19, wherein the $Li_2SO_4$-comprising aqueous solution further comprises one or more metal sulfates of one or more metals other than lithium.
21. The process of any one of items 12 to 20, wherein the metal comprising mixture further comprises one or more metals other than lithium.

22. The process of item 20 or 21, wherein the one or more metals other than lithium are one or more of Group I metals (other than lithium), Group II metals, transition metals and/or post-transition metals.

23. The process of any one of items 20 to 22, wherein the one or more metals other than lithium are one or more of calcium, sodium, magnesium, potassium, aluminum and iron.

24. The process of any one of items 20 to 23, further comprising reducing the level of species of the one or more metals other than lithium by increasing the pH of the $Li_2SO_4$-comprising aqueous solution via treatment with alkaline material.

25. The process of item 24, wherein the alkaline material comprises lime.

26 The process of item 25, wherein the lime is in the form of a lime slurry or solid lime powder.

27. The process of any one of items 24 to 26, wherein the pH of the $Li_2SO_4$-comprising aqueous solution is adjusted to be about 3.0 or higher.

28. The process of item 27, wherein the pH of the $Li_2SO_4$-comprising aqueous solution is adjusted to be about 4.0 to about 5.5.

29. The process of any one of items 24 to 27, wherein the pH of the $Li_2SO_4$-comprising aqueous solution is adjusted to be about 7.0 or higher.

30. The process of item 29, wherein the pH of the $Li_2SO_4$-comprising aqueous solution is adjusted to be about 9.0 to about 12.0.

31. The process of any one of items 24 to 27, wherein the reducing the level of species of the one or more metals other than lithium by increasing the pH of the $Li_2SO_4$-comprising aqueous solution is performed in single step.

32. The process of item 31, wherein the single step comprises adjusting the pH of the $Li_2SO_4$-comprising aqueous solution to be about 3.0 or higher.

33. The process of item 32, wherein the pH of the $Li_2SO_4$-comprising aqueous solution is adjusted to be about 4.0 to about 5.5.

34. The process of item 31, wherein the single step comprises adjusting the pH of the $Li_2SO_4$-comprising aqueous solution to be about 7.0 or higher.

35. The process of item 32, wherein the pH of the $Li_2SO_4$-comprising aqueous solution is adjusted to be about 9.0 to about 12.0.

36. The process of any one of items 24 to 27, wherein the reducing the level of species of the one or more metals other than lithium by increasing the pH of the $Li_2SO_4$-comprising aqueous solution comprises multiple steps.

37. The process of item 36, wherein the multiple steps comprise a first step of adjusting the pH of the $Li_2SO_4$-comprising aqueous solution to a pH of about 3.0 or higher to produce a first $Li_2SO_4$-comprising aqueous solution depleted of metals other than lithium, followed by adjusting the pH of the first $Li_2SO_4$-comprising aqueous solution to a pH of about 7.0 or higher to produce a second $Li_2SO_4$-comprising aqueous solution depleted of metals other than lithium.

38. The process of any one of items 30 to 37, wherein the treatment with alkaline material for reducing the level of species of the one or more metals other than lithium is prior to treatment with the one or more calcium salts.

39. The process of any one of items 30 to 37, wherein the treatment with alkaline material for reducing the level of species of the one or more metals other than lithium is performed together with treatment with the one or more calcium salts.

40. The process of any one of items 30 to 39, wherein the treatment with alkaline material for reducing the level of species of the one or more metals other than lithium is prior to treatment with the one or more barium salts.

41. The process of any one of items 16 to 40, wherein treatment of the $Li_2SO_4$-comprising aqueous solution with one or more calcium salts to form a precipitate comprising calcium sulfate ($CaSO_4$) is performed at a pH of about 7.0 or higher.

42. The process of item 41, wherein treatment of the $Li_2SO_4$-comprising aqueous solution with one or more calcium salts to form a precipitate comprising calcium sulfate ($CaSO_4$) is performed at a pH of about 9.0 to about 12.0.

43. The process of any one of items 1 to 42, wherein the treatment with one or more barium salts to form a precipitate comprising barium sulfate ($BaSO_4$) is performed at a pH of about 6.0 or higher.

44. The process of item 44, wherein the treatment with one or more barium salts to form a precipitate comprising barium sulfate ($BaSO_4$) is performed at a pH of about 9.0 to about 12.0.

45. The process of any one of items 1 to 44, wherein the one or more barium salts are added at a molar ratio of barium to sulfate of about 0.8 to about 1.2.

46. The process of item 45, wherein the one or more barium salts are added at a molar ratio of barium to sulfate of about 1.0 to about 1.2

47. The process of any one of items 20 to 46, comprising treating the solution remaining after $BaSO_4$ precipitation with a source of carbonate, such as $CO_2$ gas or a carbonate salt, to form a precipitate comprising one or more metal carbonates of the one or more metals other than lithium; wherein the lithium species is recovered from the solution remaining after precipitation of the one or more metal carbonates.

48. The process of item 47, wherein the carbonate salt is one or more of sodium carbonate ($Na_2CO_3$) or lithium carbonate ($Li_2CO_3$).

49. The process of item 47 or 48, wherein the one or more metal carbonates are one or more of calcium carbonate and magnesium carbonate.

50. The process of any one of items 1 to 49, wherein the lithium species is recovered from the solution by crystallization.

51. The process of item 50, comprising heat treatment to remove at least a part of the water in the solution.

52. The process of item 51, wherein at least about 90% of the water is removed.

53. The process of item 52, wherein at least about 95% of the water is removed.

54. The process of any one of items 1 to 53, wherein the recovered lithium species is $LiOH \cdot H_2O$.

55. The process of any one of items 1 to 54, further comprising subjecting the $BaSO_4$ to a treatment to generate barium salts including barium oxide, barium hydroxide or barium carbonate and to recover sulphur as sodium sulphide, sodium hydrosulphide, sulphuric acid, or elemental sulphur.

56. The process of item 55, wherein the BaO is used as the one or more barium salts to form the precipitate comprising $BaSO_4$.

57. The process of item 55 or 56, wherein the BaO is subjected to water treatment to form $Ba(OH)_2$.

58. The process of item 57, wherein the $Ba(OH)_2$ is used as the one or more barium salts to form the precipitate comprising $BaSO_4$.

59. The process of any one of items 55 to 58, further comprising subjecting the $SO_3$ to water treatment to form $H_2SO_4$.

60. The process of item 59, wherein the $H_2SO_4$ is used for treating the mixture as defined in any one of items 12 to 59.

61. The process of any one of items 1 to 60, wherein the $Li_2SO_4$-comprising aqueous solution is treated with the one or more barium salts at a pH of at least about 6, at least about 7, about 6 to about 12, about 7 to about 12, about 8 to about 12, about 9 to about 12, about 10 to about 12, about 6, about 7, about 8, about 9, about 10, about 11, or about 12.

62. The process of any one of items 16 to 61, wherein the $Li_2SO_4$-comprising aqueous solution is treated with the one or more calcium salts at a pH of at least about 6, at least about 7, about 6 to about 12, about 7 to about 12, about 8 to about 12, about 9 to about 12, about 10 to about 12, about 6, about 7, about 8, about 9, about 10, about 11, or about 12.

63. The process of any one of items 1 to 62, wherein the $Li_2SO_4$-comprising aqueous solution is treated with the one or more barium salts at a molar ratio of barium to sulfate of about 80% to about 120%, about 90% to about 120%, about 100% to about 120%, about 90% to about 110%, about 80%, about 90%, about 100%, about 110% or about 120%.

64. The process of any one of items 16 to 63, wherein the $Li_2SO_4$-comprising aqueous solution is treated with the one or more calcium salts at a molar ratio of calcium to sulfate of about 80% to about 120%, about 90% to about 120%, about 100% to about 120%, about 90% to about 110%, about 80%, about 90%, about 100%, about 110% or about 120%.

65. The process of any one of items 1 to 64, wherein the $Li_2SO_4$-comprising aqueous solution is treated with the one or more barium salts at a temperature of about 1° C. to about 100° C., about 5° C. to about 75° C., about 5° C. to about 60° C., about 10° C. to about 60° C., about 15° C. to about 60° C., about 20° C. to about 60° C., or at room temperature.

66. The process of any one of items 1 to 65, wherein the $Li_2SO_4$-comprising aqueous solution is treated with the one or more barium salts at a temperature of about 1° C. to about 100° C., about 5° C. to about 60° C., about 5° C. to about 75° C., about 10° C. to about 60° C., about 15° C. to about 60° C., about 20° C. to about 60° C., or at room temperature.

67. The process of any one of items 20 to 66, wherein the solution remaining after $BaSO_4$ precipitation is treated with a carbonate salt at a molar ratio of carbonate to the one or more metals other than lithium of about 80% to about 120%, about 90% to about 120%, about 100% to about 120%, 90% to about 110%, about 80%, about 90%, about 100%, about 110% or about 120%.

68. The process of any one of items 1 to 67, wherein the concentration of lithium in the $Li_2SO_4$-comprising aqueous solution is about 1 to about 25 g/L, about 5 to about 25 g/L, about 5 to about 20 g/L, about 5 to about 15 g/L, about 8 to about 12 g/L about 5 g/L, about 6 g/L, about 7 g/L, about 8 g/L, about 9 g/L, about 10 g/L, about 11 g/L, about 12 g/L, about 13 g/L, about 14 g/L, or about 15 g/L.

69. The process of any one of items 1 to 68, wherein at least about 50%, 55%, 60%, 65%, 70%, 75%, 80%, 90% or 95% of the lithium species is recovered from the $Li_2SO_4$-comprising aqueous solution.

70. The process of any one of items 1 to 69, wherein about 50% to about 97%, about 55% to about 97%, about 60% to about 97%, about 65% to about 97%, about 70% to about 97%, about 75% to about 97%, about 80% to about 97%, or about 90% to about 97% of the lithium species is recovered from the $Li_2SO_4$-comprising aqueous solution.

71. A process for recovering a lithium (Li) species from a mixture comprising a lithium species and species of one or more metals other than lithium, comprising:
treating the mixture with sulfuric acid ($H_2SO_4$) to provide a $Li_2SO_4$-comprising aqueous solution;
treating the $Li_2SO_4$-comprising aqueous solution with one or more barium salts to form a precipitate comprising barium sulfate ($BaSO_4$);
treating the solution remaining after $BaSO_4$ precipitation with a carbonate salt to form a precipitate comprising one or more metal carbonates of the one or more metals other than lithium;
recovering the lithium species from the solution remaining after precipitation of the one or more metal carbonates in the form of lithium hydroxide (LiOH) or a hydrate thereof, via heat treatment and crystallization.

72. The process of item 71, further comprising:
treating the $Li_2SO_4$-comprising aqueous solution with one or more calcium salts to form a precipitate comprising calcium sulfate ($CaSO_4$);
wherein the solution remaining after $CaSO_4$ precipitation is treated with the one or more barium salts to form the precipitate comprising $BaSO_4$.

73. The process of item 71 or 72, wherein the mixture is obtained from a natural source comprising lithium species.

74. The process of item 73, wherein the natural source is an ore, clay, brine or other mineral deposit.

75. The process of item 74, wherein the ore or clay comprises lepidolite, hectorite, jaderite, spodumene, petalite and/or amblygonite.

76. The process of any one of items 73 to 75, wherein the natural source or mineral deposit comprising lithium species is not a sulfide ore body.

77. The process of item 76, wherein the brine comprises continental brine, geothermal brine and/or oilfield brine.

78. The process of item 71 or 72, wherein the mixture is obtained from a synthetic or non-natural source comprising lithium species.

79. The process of item 78, wherein the synthetic or non-natural source comprising lithium species comprises materials produced during recycling of lithium-ion batteries or other lithium bearing materials.

80. The process of item 79, wherein the materials produced during recycling of lithium-ion batteries comprise lithium-ion battery electrode material.

81. The process of item 80, wherein the lithium-ion battery electrode material comprises lithium cobalt oxide, lithium manganese oxide, lithium iron phosphate, and/or lithium nickel manganese cobalt oxide.

Other objects, advantages and features of the present disclosure will become more apparent upon reading of the following non-restrictive description of specific embodiments thereof, given by way of example only with reference to the accompanying drawings.

DESCRIPTION OF ILLUSTRATIVE EMBODIMENTS

Definitions

The use of the terms "a" and "an" and "the" and similar referents in the context of describing the technology (especially in the context of the following claims) are to be construed to cover both the singular and the plural, unless otherwise indicated herein or clearly contradicted by context.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains") are to be construed as open-ended terms (i.e., meaning "including, but not limited to") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All subsets of values within the ranges are also incorporated into the specification as if they were individually recited herein.

All methods or processes described herein can be performed in any suitable order unless otherwise indicated herein or otherwise clearly contradicted by context. Further, in embodiments various steps may be repeated, for example to increase recovery and/or purification.

The use of any and all examples, or exemplary language (e.g., "such as") provided herein, is intended merely to better illuminate the disclosure and does not pose a limitation on the scope of the disclosure unless otherwise claimed.

No language in the specification should be construed as indicating any non-claimed element as essential to the practice of the disclosure.

As used herein when referring to numerical values or percentages, the term "about" has its ordinary meaning, and includes variations due to the methods used to determine the values or percentages, statistical variance and human error. Moreover, each numerical parameter in this application should at least be construed in light of the number of reported significant digits and by applying ordinary rounding techniques. In embodiments, it may mean plus or minus 10% of the numerical value qualified.

Unless otherwise defined, all technical and scientific terms used herein have the same meaning as commonly understood by one of ordinary skill in the art to which this disclosure belongs.

It is to be understood that the present disclosure is not limited to the particular embodiments described below, as variations of these embodiments may be made and still fall within the scope of the present disclosure. It is also to be understood that the terminology employed is for the purpose of describing particular embodiments, and is not intended to be limiting.

In order to provide a clear and consistent understanding of the terms used in the present specification, a number of definitions are provided below. Moreover, unless defined otherwise, all technical and scientific terms as used herein have the same meaning as commonly understood to one of ordinary skill in the art to which this disclosure pertains.

The present disclosure reports the design and study of a process for recovering lithium species from an aqueous solution comprising lithium species in the form of lithium sulfate ($Li_2SO_4$). In an aspect, the process comprises:

treating the $Li_2SO_4$-comprising aqueous solution with one or more barium salts to form a precipitate comprising barium sulfate ($BaSO_4$); and recovering lithium species from the solution remaining after $BaSO_4$ precipitation.

Precipitation is understood in the chemical field to relate to the process by which one state is ejected or formed from another state, such as the creation of a solid from a solution, e.g., via a reaction that creates an insoluble product. The resulting precipitate or solid may remain in solution, may settle by gravity, or may be separated from the solution by other means, such as by sedimentation/centrifugation or filtration. The resulting liquid or solution remaining after sedimentation/centrifugation is often referred to as a supernate or supernatant; the resulting liquid or solution remaining after filtration is often referred to as a filtrate. In embodiments described herein, such resulting liquid or solution remaining after precipitation may be subjected to further treatments in a stepwise recovery or purification process. Similarly, in embodiments the precipitates may be treated to generate compounds for various uses, such as the recycling steps described herein. In embodiments, the precipitate may be subjected to one or more washes (e.g. with water), and the wash liquid may also be subjected to further treatments in a stepwise recovery or purification process (e.g. in combination with the resulting liquid or solution remaining after precipitation).

In an embodiment, lithium species may be recovered in the form of lithium hydroxide (LiOH) or a hydrate thereof, such as $LiOH·H_2O$.

Preparation of $Li_2SO_4$-Comprising Aqueous Solution

In an embodiment, the process further comprises preparing the $Li_2SO_4$-comprising aqueous solution via treatment of a metal-comprising mixture with sulfuric acid ($H_2SO_4$) (e.g., via sulfuric acid leaching). In embodiments, the metal-comprising mixture comprises metal species other than lithium species, and recovery of the lithium species from such a mixture comprises obtaining a preparation enriched in lithium species and having reduced amounts of metal species other than lithium species, relative to the starting mixture. In embodiments, such metal species other than lithium comprise one or more Group I metals (other than lithium), Group II metals, transition metals and/or post-transition metals. In embodiments, such metals other than lithium comprise one or more of calcium, sodium, magnesium, potassium, aluminum and iron.

In embodiments, the $Li_2SO_4$-comprising aqueous solution has a pH of about 4.0 or less, in a further embodiment of about 3.5 or less, in a further embodiment of about 3.0 or less, in further embodiments of about 2.9 or less, 2.8 or less, 2.7 or less, 2.6 or less, or 2.5 or less. In further embodiments the $Li_2SO_4$-comprising aqueous solution has a pH of about 2.0 to about 3.0, about 2.1 to about 2.9, about 2.2 to about 2.8, about 2.3 to about 2.7, about 2.4 to about 2.6, or about 2.5.

Removal of Metal Species Other than Lithium Species

In embodiments, reduction of the amount/removal of metal species other than lithium species present in the $Li_2SO_4$-comprising aqueous solution may be accomplished by increasing the pH of the $Li_2SO_4$-comprising aqueous solution via treatment with alkaline material (e.g. lime, for example as a lime slurry or solid lime powder). In embodiments, the pH of the $Li_2SO_4$-comprising aqueous solution is adjusted to be about 3.0 or higher, in a further embodiment about 3.0 to about 7.0, in a further embodiment about 3.0 to about 6.0, in a further embodiment about 3.5 to about 5.5, in a further embodiment about 4.0 to about 5.5, in a further embodiment about 4.5 to about 5.0, in further embodiments, about 4.5, about 4.75 or about 5.0.

In embodiments, the metal species other than lithium, if in reduced form, may be treated with oxygen or other oxidants to be oxidized to more oxidized forms, prior to removal via pH adjustment.

In embodiments, the reduction of the amount/removal of metal species other than lithium species may be performed at ambient temperature (e.g. about 25° C.) or higher, in a further embodiment at about 25° C. to about 100° C., in a further embodiment at about 30° C. or higher, in a further embodiment at about 30° C. to about 100° C., in a further embodiment at about 35° C. or higher, in a further embodiment at about 35° C. to about 100° C., in a further embodiment about 40° C. or higher, in a further embodiment about 40° C. to about 100° C., in a further embodiment at about 45° C. or higher, in a further embodiment at about 45° C. to about 100° C., in a further embodiment at about 50° C. or higher, in a further embodiment at about 50° C. to about 100° C., in a further embodiment about 55° C. or higher, in a further embodiment about 55° C. to about 100° C., in a further embodiment at about 60° C. or higher, in a further embodiment at about 60° C. to about 100° C., in a further embodiment at about 65° C. or higher, in a further embodiment at about 65° C. to about 100° C., in a further embodiment about 70° C. or higher, in a further embodiment about 70° C. to about 100° C., in a further embodiment at about 75° C. or higher, in a further embodiment at about 75° C. to about 100° C., in a further embodiment at about 80° C. or higher, in a further embodiment at about 80° C. to about 100° C., in a further embodiment about 85° C. or higher, in a further embodiment about 85° C. to about 100° C., in a further embodiment at about 90° C. or higher, in a further embodiment at about 90° C. to about 100° C., in a further embodiment at about 95° C. or higher, in a further embodiment at about 95° C. to about 100° C.

In embodiments, the reduction of the amount/removal of metal species other than lithium species results in a removal of at least about 80%, at least about 85%, at least about 90%, at least about 91%, at least about 92%, at least about 93%, at least about 94%, at least about 95%, at least about 96%, at least about 97%, at least about 98%, or at least about 99% of of metal species other than lithium species.

In embodiments, the step of reduction of the amount/removal of metal species other than lithium species results in less than about 10%, less than about 9%, less than about 8%, less than about 7%, less than about 6%, less than about 5%, less than about 4%, less than about 3%, less than about 2% or less than about 1% of lithium species.

Further Removal of Metal Species Other than Lithium Species

In embodiments, a further step for the reduction of the amount/removal of metal species other than lithium species may be performed, to for example remove other metals other than lithium species, for example via treatment with alkaline material (e.g. lime, for example as a lime slurry or solid lime powder) to increase the pH of the solution, for example to be about 7.0 or higher, in a further embodiment about 7.5 or higher, in a further embodiment about 8.0 or higher, in a further embodiment about 8.5 or higher, in a further embodiment about 9 or higher, in a further embodiment, about 9.5 to about 12.5, in a further embodiment about 9.0 to about 12.0, in a further embodiment, about 9.2 to about 12.0, in further embodiments about 9.0, about 9.5, about 10.0, about 10.5, about 11.0, about 11.5 or about 12.0.

In embodiments, different sources of such a metal-comprising mixture may be used in the processes described herein. For example, natural sources or mineral deposits may be used, such as an ore, clay or brine comprising lithium species. In embodiments, such ores or clays comprise for example minerals such as lepidolite, hectorite, jaderite, spodumene, petalite and/or amblygonite. Brines include for example continental brines, geothermal brines and oilfield brines.

In an embodiment, the natural source or mineral deposit is not a sulfide ore body.

In a further embodiment, synthetic, non-natural, processed or man-made sources may be used to as a starting material for the processes described herein, such as materials produced during recycling of lithium ion batteries, e.g. from the electrode materials thereof (which in embodiments comprise lithium species such as lithium cobalt oxide ($LiCoO_2$), lithium manganese oxide ($LiMn_2O_4$), lithium iron phosphate ($LiFePO_4$), lithium nickel manganese Cobalt (NMC;Li(NiMnCo)$O_2$)).

In embodiments, such natural or synthetic/non-natural sources may be treated by hydrometallurgy, pyrometallurgy and/or electrometallurgy processes. In embodiments, such natural or synthetic/non-natural sources may be treated by processes such as calcination, roasting, alkali or acid treatment, and leaching (with water to generate an aqueous solution comprising metal salts).

In an embodiment, the starting mixture (metal-comprising mixture) is not obtained by electrolysis.

In an embodiment the starting mixture (metal-comprising mixture) comprises lithium species in the form of lithium oxide ($Li_2O$).

In embodiments, the precipitation of barium sulfate may be using one or more barium salts, such as soluble or slightly soluble Ba salts and compounds, such as barium hydroxide ($Ba(OH)_2$), barium oxide (BaO), barium carbonate ($BaCO_3$) or a combination thereof, or their hydrates such as $Ba(OH)_2 \cdot H_2O$ through $Ba(OH)_2 \cdot 8H_2O$.

Primary Sulfate Removal

In embodiments, a further sulfate precipitation, e.g. a primary sulfate removal, may be used via precipitation with a salt other that a barium salt, such as one or more calcium salts. In an embodiment, the process described herein further comprises treating the $Li_2SO_4$-comprising aqueous solution with one or more calcium salts to form a precipitate comprising calcium sulfate ($CaSO_4$). This step is preferably carried out prior to precipitation with one or more barium salts, e.g., the solution remaining after $CaSO_4$ precipitation is treated with the one or more barium salts to form the precipitate comprising $BaSO_4$.

In embodiments, such a primary step of sulfate removal, prior to treatment with one or more bariums salts, is performed via treatment with a salt other than a barium salt, such as one or more calcium salts, such as in the form of an alkaline material (e.g. lime, for example as a lime slurry or solid lime powder) to increase the pH of the solution, for example to be about 7.0 or higher, in a further embodiment about 7.5 or higher, in a further embodiment about 8.0 or higher, in a further embodiment about 8.5 or higher, in a further embodiment about 9 or higher, in a further embodiment, about 9.5 to about 12.5, in a further embodiment about 9.0 to about 12.0, in a further embodiment, about 9.2 to about 12.0, in further embodiments about 9.0, about 9.5, about 10.0, about 10.5, about 11.0, about 11.5 or about 12.0. In an embodiment, such a primary step of sulfate removal also results in the further reduction of the amount/removal of metal species other than lithium species.

In embodiments, the steps of further removal of metal species other than lithium species and primary sulfate removal may be combined into one step.

In embodiments the steps of removal of metal species other than lithium species, further removal of metal species other than lithium species and primary sulfate removal may be combined into one step, via direct treatment of the $Li_2SO_4$-comprising aqueous solution with a salt other than a barium salt, such as one or more calcium salts in the form of an alkaline material (e.g. lime, for example as a lime slurry or solid lime powder) to increase the pH of the solution as noted above, thus resulting in both removal of metal species other than lithium species and primary sulfate precipitation in a single step.

Following treatment with one or more calcium salts, gypsum is produced as a by-product. In embodiments, the gypsum may be recycled for other purposes. In such a case, it is preferred to perform the removal of metal species other than lithium species and primary sulfate removal in separate steps, so that the gypsum produced has fewer metal contaminants.

In embodiments, the $Li_2SO_4$-comprising aqueous solution is treated with the one or more barium salts and/or the one or more calcium salts at a pH of about 6.0 or higher, in a further embodiment about 7.0 or higher, in a further embodiment about 7.5 or higher, in a further embodiment about 8.0 or higher, in a further embodiment about 8.5 or higher, in a further embodiment about 9 or higher, in a further embodiment, about 9.5 to about 12.5, in a further embodiment about 9.0 to about 12.0, in a further embodiment, about 9.2 to about 12.0, in further embodiments about 9.0, about 9.5, about 10.0, about 10.5, about 11.0, about 11.5 or about 12.0. In an embodiment, when such a step is performed subsequent to the primary sulfate removal noted above (with a salt other that a barium salt, such as one or more calcium salts), $BaSO_4$ precipitation may be performed without adjusting the pH of the mixture prior to addition of the one or more barium salts.

In embodiments, the one or more barium salts are added at a molar ratio of barium to sulfate at a ratio of 0.8 to a ratio of about 1.2, in a further embodiment at a ratio of about 0.9 to a ratio of about 1.2, in a further embodiment at a ratio of about 0.9 to a ratio of about 1.2, in a further embodiment at a ratio of about 0.9 to a ratio of about 1.1, in a further embodiment at a ratio of about 0.95 to a ratio of about 1.05, in a further embodiment at a ratio of about 1.0 to a ratio of about 1.2, e in a further embodiment at a ratio of about 1.0 to a ratio of about 1.1, in a further embodiment at a ratio of about 1.0 to a ratio of about 1.05, in further embodiments at a ratio of about 0.9, 0.95, 0.98, 1.0, 1.02 1.05, 1.08 or 1.10.

In embodiments, the $Li_2SO_4$-comprising aqueous solution is treated with the one or more barium salts at a molar ratio of barium to sulfate of about 80% to about 120%, about 90% to about 120%, about 100% to about 120%, about 90% to about 110%, about 80%, about 90%, about 100%, about 110% or about 120%.

In embodiments, the $Li_2SO_4$-comprising aqueous solution is treated with the one or more calcium salts at a molar ratio of calcium to sulfate of about 80% to about 120%, about 90% to about 120%, about 100% to about 120%, about 90% to about 110%, about 80%, about 90%, about 100%, about 110% or about 120%.

In embodiments, the $Li_2SO_4$-comprising aqueous solution is treated with the one or more barium salts and/or the one or more calcium salts at a temperature of about 1° C. to about 100° C., about 5° C. to about 75° C., about 5° C. to about 60° C., about 10° C. to about 60° C., about 15° C. to about 60° C., about 20° C. to about 60° C., or at room temperature.

In embodiments, the solution remaining after $BaSO_4$ precipitation is treated with a carbonate salt at a molar ratio of carbonate to the one or more metals other than lithium of about 80% to about 120%, about 90% to about 120%, about 100% to about 120%, about 90% to about 110%, about 80%, about 90%, about 100%, about 110% or about 120%.

In embodiments, the concentration of lithium in the $Li_2SO_4$-comprising aqueous solution is about 1 to about 25 g/L, about 5 to about 25 g/L, about 5 to about 20 g/L, about 5 to about 15 g/L, about 8 to about 12 g/L about 5 g/L, about 6 g/L, about 7 g/L, about 8 g/L, about 9 g/L, about 10 g/L, about 11 g/L, about 12 g/L, about 13 g/L, about 14 g/L, or about 15 g/L.

In embodiments, at least about 50%, 55%, 60%, 65%, 70%, 75%, 80%, 90% or 95% of the lithium species is recovered from the $Li_2SO_4$-comprising aqueous solution. In embodiments, about 50% to about 97%, about 55% to about 97%, about 60% to about 97%, about 65% to about 97%, about 70% to about 97%, about 75% to about 97%, about 80% to about 97%, or about 90% to about 97% of the lithium species is recovered from the $Li_2SO_4$-comprising aqueous solution.

In an embodiment, the present disclosure relates to a process for recovering lithium (Li) species from a mixture comprising lithium species and species of one or more metals other than lithium, comprising:
  treating the mixture with sulfuric acid ($H_2SO_4$) to provide a $Li_2SO_4$-comprising aqueous solution;
  treating the $Li_2SO_4$-comprising aqueous solution with one or more barium salts to form a precipitate comprising barium sulfate ($BaSO_4$);
  treating the solution remaining after $BaSO_4$ precipitation with a carbonate salt to form a precipitate comprising one or more metal carbonates of the one or more metals other than lithium;
  recovering lithium species from the solution remaining after precipitation of the one or more metal carbonates in the form of lithium hydroxide (LiOH) or a hydrate thereof, via heat treatment and crystallization.

In an embodiment, the process further comprises:
  treating the $Li_2SO_4$-comprising aqueous solution with one or more calcium salts to form a precipitate comprising calcium sulfate ($CaSO_4$);
  wherein the solution remaining after $CaSO_4$ precipitation is treated with the one or more barium salts to form the precipitate comprising $BaSO_4$.

In embodiments, the processes described herein further comprise one or more steps to remove or reduce the level of non-lithium metal species present in the solutions or filtrates obtained during the process. In embodiments, such steps may be carried out prior to or subsequent to BaSO₄ precipitation (and optionally CaSO₄ precipitation) but prior to recovery (e.g., by precipitation or crystallization) of the lithium species. In embodiments, such further treatment comprises treating the solution remaining after BaSO₄ precipitation (and optionally CaSO₄ precipitation) with any source of carbonate, such as CO₂ gas, and/or a carbonate salt, to form a precipitate comprising one or more metal carbonates of the one or more metals other than lithium. In embodiments, the carbonate salt is sodium carbonate (Na₂CO₃) or lithium carbonate (Li₂CO₃), or a combination thereof. In embodiments the non-lithium metals include calcium and/or magnesium, in which case treatment with a source of carbonate (e.g., CO₂ gas and/or carbonate) salt shall generate calcium carbonate and/or magnesium carbonate.

In embodiments, the process further comprises a step of recovering the lithium species from the solution, for example by crystallization. In embodiments, such a step further comprises heat treatment to remove or boil off at least a part of the water in the solution. In embodiments, at least about 90% of the water is removed, in a further embodiment, at least about 95% of the water is removed.

In embodiments, various products obtained in one or more steps of the process may be recycled back to a form for use in the process. For example, in embodiments, the BaSO₄ may be treated, e.g. by calcination, to form BaO and SO₃. In an embodiment, the BaO can be used as a barium salt to form the precipitate comprising BaSO₄. In a further embodiment, the BaO can be converted into Ba(OH)₂ (by water treatment), which can then be used a barium salt to form the precipitate comprising BaSO₄. Similarly, in embodiments, the regenerated SO₃ may be subjected to water treatment to form H₂SO₄, which can then be used to prepare the Li₂SO₄-comprising aqueous solution, e.g., for treating the starting mixture described herein.

BaSO₄ is generated when one or more barium salts are added to the sulphate solution. The solid barium sulphate precipitate is separated from the lithium solution for example by filtration, centrifuge or by settling in a thickener.

Several commercial processes exist to transform barium sulphate into the barium salts suitable for sulphate removal. This effectively regenerates the barium salt and improves the economics of the process. Integrating a barium salt regeneration step with for example the lithium hydroxide precipitation reduces shipping costs and can be synergistic with the lithium process.

Processes for converting barium sulphide into barium salts are known. For example, U.S. Pat. No. 1,648,870 (1925) establishes the production of BaS. For example barium sulphate may be reduced at 1000° C. with carbon to produce barium sulphide.

BaSO₄+4C→BaS+4CO

U.S. Pat. No. 1,615,515A (1922) establishes the method for producing barium carbonate. Barium sulphide is highly soluble and is dissolved in water. The barium sulphide solution may be subsequently reacted with for example either soda ash or carbon dioxide to produce barium carbonate.

BaS+Na₂CO₃→BaCO₃+Na₂S

BaS+CO₂+H₂O→BaCO₃+H₂S

With soda ash treatment, the BaCO₃ is filtered and recycled, while the Na₂S can be recovered in solution and crystallized as a byproduct. With carbon dioxide precipitation, the barium carbonate is similarly filtered, while the H₂S gas is recovered and converted to elemental Sulphur using the Claus process or combusted in air to produce SO₂ gas which can be readily recovered as sulphuric acid in an acid plant. The advantage here is that the lithium processing plant requires sulphuric acid for extraction from spodumene and this reduces a significant operating cost.

U.S. Pat. No. 779,210A (1904) establishes the conversion of the barium carbonate to barium oxide through calcination. Barium carbonate can be further processed using calcination at 1000° C. to produce barium oxide. Barium oxide reacts with water to form barium hydroxide.

The present disclosure is illustrated in further detail by the following non-limiting examples.

Example 1: Lithium Purification Procedure-Direct Lithium Hydroxide Test 1

The following Stages 1-5 describe the preparation of a model synthetic solution of a mixture of metal sulphates and the subsequent recovery of Li in the form of LiOH·H₂O. Analysis of samples and results are shown in Table 1.

Stage 1—Preparation of Synthetic Solution
1. The following were combined in a 2 L leach kettle:
   a. 500 mL of de-ionized water
   b. 50.7 g Li₂SO₄·H₂O
   c. 680 mg of CaSO₄ (anhydrous)
   d. 725 mg of Na₂SO₄ (anhydrous)
   e. 200 mg of MgSO₄ (anhydrous)
   f. 1450 mg of K₂SO₄
2. Mixed at 350 to 400 rpm at 25° C.
3. Sample of the solution was taken for chemical analysis, and verified that all solids are dissolved.

Stage 2—Sulphate Removal 1
4. At room temperature, solid Ca(OH)₂ was added to raise the pH of the filtrate from Stage 1 to pH 11. The total amount of Ca(OH)₂ added to the solution was recorded, so that the Ca concentration in the solution can be calculated. Held in a stirred reactor at room temperature for 60 minutes.
5. The slurry was vacuum filtered and the solids were washed with at least 1000 ml of de-ionized water.
6. The filtrate and wash water were weighed, and their specific gravities were measured.
7. A sample of the solution and wash water were taken and submitted for analysis for Li, Al, Fe, Na, K, Ca, Mg, Si.
8. The solids were dried in an oven at 40° C. overnight. Dried solids were weighed.
9. The solids were assayed for Li, S, Al, Ca, Fe, K, Mg, Mn, Si.

Stage 3—Sulphate Removal 2
10. At room temperature, Ba(OH)₂ was added to remove the remaining sulphate from solution. The Ba(OH)₂ addition was based on the estimated sulphate content of the solution and was at a 1:1 molar ratio of Ba:SO₄. Held in a stirred reactor at room temperature for 60 minutes. The total amount of Ba(OH)₂ added to the solution was recorded.
11. Solid BaSO₄ was formed.
12. The slurry was vacuum filtered and the solids were washed with de-ionized water
13. The filtrate and wash water were weighed, and their specific gravities were measured.

14. A sample of the solution and wash water was taken and submitted for analysis for Li, Al, Fe, Na, K, Ca, Mg, Si.

15. The solids were dried in an oven at 40° C. overnight. The dried solids were weighed.

Stage 4—Ca/Mg Removal 16. 45 g/L Na$_2$CO$_3$ solution was added to the solution, to add Na$_2$CO$_3$ at a molar 1:1 ratio of CO$_3$:Ca.

17. Held in an agitated leach kettle for 1 hour at room temperature to remove Ca from solution.

18. The slurry was vacuum filtered and the solids were washed with de-ionized water 19. The filtrate and wash water were weighed, and their specific gravities were measured.

20. A sample of the solution and wash water was taken and submitted for analysis for Li, Al, Fe, Na, K, Ca, Mg, Si.

21. The solids were dried in an oven at 40° C. overnight. The dried solids were weighed.

22. The solids were assayed for Li, S, Al, Ca, Fe, K, Mg, Mn, Si.

Stage 5—LiOH·H$_2$O Precipitation

23. ~95% of the mass of the water from the filtrate from Stage 2 Ca/Mg Removal was boiled off.

24. White LiOH crystals crystallized.

25. A sample of the solids was assayed. The mass of the solids was recorded.

26. Residues were assayed for Na, Li, S, Al, Ca, Fe, K, Mg, Mn, Si.

27. Solutions were assayed for Li, Al, Fe, Na, K, Ca, Mg, Si.

TABLE 1

Direct Lithium Hydroxide-Test 1 Mass Balance

Stage 2-Sulphate Removal 1

| Sample | Mass mL | Al mg/L | Ba mg/L | Ca mg/L | Fe mg/L | K mg/L | Li mg/L | Mg mg/L | Si mg/L | S mg/L | Na mg/L |
|---|---|---|---|---|---|---|---|---|---|---|---|
| Stage 1 Synthetic Solution | 480 | <1 | <1 | 388 | <1 | <5 | 11200 | 80.1 | <5 | | 500 |
| Ca(OH)$_2$ | 0.43 grams | wt % | wt % | 54.1 wt % | wt % | wt % | wt % | wt % | wt % | wt % | wt % |
| Stage 2 Filtrate | 470 | <1 | <1 | 642 | <1 | <5 | 11400 | 72 | <5 | | 591 |

| Sample | | Al grams | Ba grams | Ca grams | Fe grams | K grams | Li grams | Mg grams | Si grams | S grams | Na grams |
|---|---|---|---|---|---|---|---|---|---|---|---|
| Stage 1 Synthetic Solution | | | | 0.19 | | | 5.38 | 0.04 | | | 0.24 |
| Ca(OH)$_2$ | | | | 0.23 | | | | | | | |
| Total In | | 0.00 | 0.00 | 0.42 | 0.00 | 0.00 | 5.38 | 0.04 | 0.00 | 0.00 | 0.24 |
| Stage 2 Filtrate | | | | 0.30 | | | 5.36 | 0.03 | | | 0.28 |
| Sample | | 0.00 | 0.00 | 0.30 | 0.00 | 0.00 | 5.36 | 0.03 | 0.00 | 0.00 | 0.28 |

| | | Al % | Ba % | Ca % | Fe % | K % | Li % | Mg % | Si % | S % | Na % |
|---|---|---|---|---|---|---|---|---|---|---|---|
| Stage 2 Accountability (Out/In) | | | | 72.04 | | | 99.67 | 88.01 | | | 115.74 |

Stage 3-Sulphate Removal 2

| Sample | Mass mL | Al mg/L | Ba mg/L | Ca mg/L | Fe mg/L | K mg/L | Li mg/L | Mg mg/L | Si mg/L | S mg/L | Na mg/L |
|---|---|---|---|---|---|---|---|---|---|---|---|
| Stage 2 Filtrate | 460 | <1 | <1 | 642 | <1 | <5 | 11400 | 72 | <5 | | 591 |
| Ba(OH)$_2$ | 64.66 grams | wt % | 80.1 wt % | wt % | wt % | wt % | wt % | wt % | wt % | wt % | wt % |

| Sample | Mass grams | Al wt % | Ba wt % | Ca wt % | Fe wt % | K wt % | Li wt % | Mg wt % | Si wt % | S wt % | Na wt % |
|---|---|---|---|---|---|---|---|---|---|---|---|
| Stage 3 Residue | 86 mL | 3.16 mg/L | 0.247 mg/L | 0.0043 mg/L | mg/L | mg/L | 0.121 mg/L | 0.0474 mg/L | 0.0022 mg/L | 0.028 mg/L | 0.0097 mg/L |
| Stage 3 Filtrate | 365 | 2.8 | <1 | 47.3 | <1 | <5 | 11000 | <5 | <5 | | 528 |
| Stage 3 Wash Water | 410 | 1.4 | 509 | 33.7 | <1 | <5 | 2030 | <5 | <5 | | 117 |

| Sample | | Al grams | Ba grams | Ca grams | Fe grams | K grams | Li grams | Mg grams | Si grams | S grams | Na grams |
|---|---|---|---|---|---|---|---|---|---|---|---|
| Stage 2 Filtrate | | | | 0.295 | | | 5.244 | 0.033 | | | 0.272 |
| Ba(OH)$_2$ | | | 51.822 | | | | | | | | |
| Total in | | 0.000 | 51.822 | 0.295 | 0.000 | 0.000 | 5.244 | 0.033 | 0.000 | 0.000 | 0.272 |
| Stage 3 Residue | | 0.000 | 2.718 | 0.212 | 0.004 | 0.000 | 0.104 | 0.041 | 0.002 | 0.024 | 0.008 |
| Stage 3 Filtrate | | 0.001 | 0.000 | 0.017 | | | 4.015 | | | | 0.193 |
| Stage 3 Wash Water | | 0.001 | 0.209 | 0.014 | | | 0.832 | | | | 0.048 |
| Total out | | 0.002 | 2.927 | 0.244 | 0.004 | 0.000 | 4.951 | 0.041 | 0.002 | 0.024 | 0.249 |

TABLE 1-continued

Direct Lithium Hydroxide-Test 1 Mass Balance

|  | Al % | Ba % | Ca % | Fe % | K % | Li % | Mg % | Si % | S % | Na % |
|---|---|---|---|---|---|---|---|---|---|---|
| Stage 3 Accountability (Out/In) |  | 5.65 | 82.45 |  |  | 94.42 | 123.08 |  |  | 91.60 |

Stage 4 Ca/Mg Removal & Stage 5 LiOH Precipitation

| Sample | Mass mL | Al mg/L | Ba mg/L | Ca mg/L | Fe mg/L | K mg/L | Li mg/L | Mg mg/L | Si mg/L | S mg/L | Na mg/L |
|---|---|---|---|---|---|---|---|---|---|---|---|
| Stage 3 Filtrate | 345 | <1 | <1 | 388 | <1 | <5 | 11200 | 80.1 | <5 |  | 500 |
| $Na_2CO_3$ (45 g/L) | 26 |  |  |  |  |  |  |  |  |  | 19521.7 |

| Sample | Mass grams | Al wt % | Ba wt % | Ca wt % | Fe wt % | K wt % | L wt % | Mg wt % | Si wt % | S wt % | Na wt % |
|---|---|---|---|---|---|---|---|---|---|---|---|
| LiOH Crystals | 0.5 | 0.067 | 1.1 | 1.36 | 0.0085 | 0.0056 | 17.7 | 0.024 | 0.0755 | 0.592 | 0.114 |
| LiOH Crystals | 21.8 | 0.0079 | <0.01 | 0.0037 | <0.002 | 0.0032 | 15.3 | <0.002 | 0.089 | 2.850 | 0.926 |
|  | mL | mg/L | mg/L | mg/L | mg/L | mg/L | mg/L | mg/L | mg/L | mg/L | mg/L |
| Stage 5 Filtrate | 9 | 48.8 | 5.2 | 42.9 | <1 | 21 | 35600 | <5 | 26 |  | 19300 |

| Sample | Al grams | Ba grams | Ca grams | Fe grams | K grams | Li grams | Mg grams | Si grams | S grams | Na grams |
|---|---|---|---|---|---|---|---|---|---|---|
| Stage 3 Filtrate |  |  | 0.13 |  |  | 3.86 | 0.03 |  |  | 0.17 |
| $Na_2CO_3$ (45 g/L) |  |  |  |  |  |  |  |  |  | 0.51 |
| Total in | 0.00 | 0.00 | 0.13 | 0.00 | 0.00 | 3.86 | 0.03 | 0.00 | 0.00 | 0.68 |
| LiOH Crystals | 0.00 | 0.01 | 0.01 | 0.00 | 0.00 | 0.09 | 0.00 | 0.00 | 0.00 | 0.00 |
| LiOH Crystals | 0.00 |  | 0.00 |  | 0.00 | 3.34 |  | 0.02 | 0.62 | 0.20 |
| Stage 5 Filtrate | 0.00 | 0.00 | 0.00 |  | 0.00 | 0.32 |  | 0.00 |  | 0.17 |
| Total Out | 0.00 | 0.01 | 0.01 | 0.00 | 0.00 | 3.74 | 0.00 | 0.02 | 0.62 | 0.38 |

|  | Al % | Ba % | Ca % | Fe % | K % | Li % | Mg % | Si % | S % | Na % |
|---|---|---|---|---|---|---|---|---|---|---|
| Stage 4 & 5 Accountability (Out/In) |  |  | 5.97 |  |  | 96.90 | 0.43 |  |  | 55.31 |
| Overall Recovery to LiOH Crystals |  | 0.01 | 1.82 |  |  | 63.69 | 0.31 |  |  | 27.08 |

Figure 1:
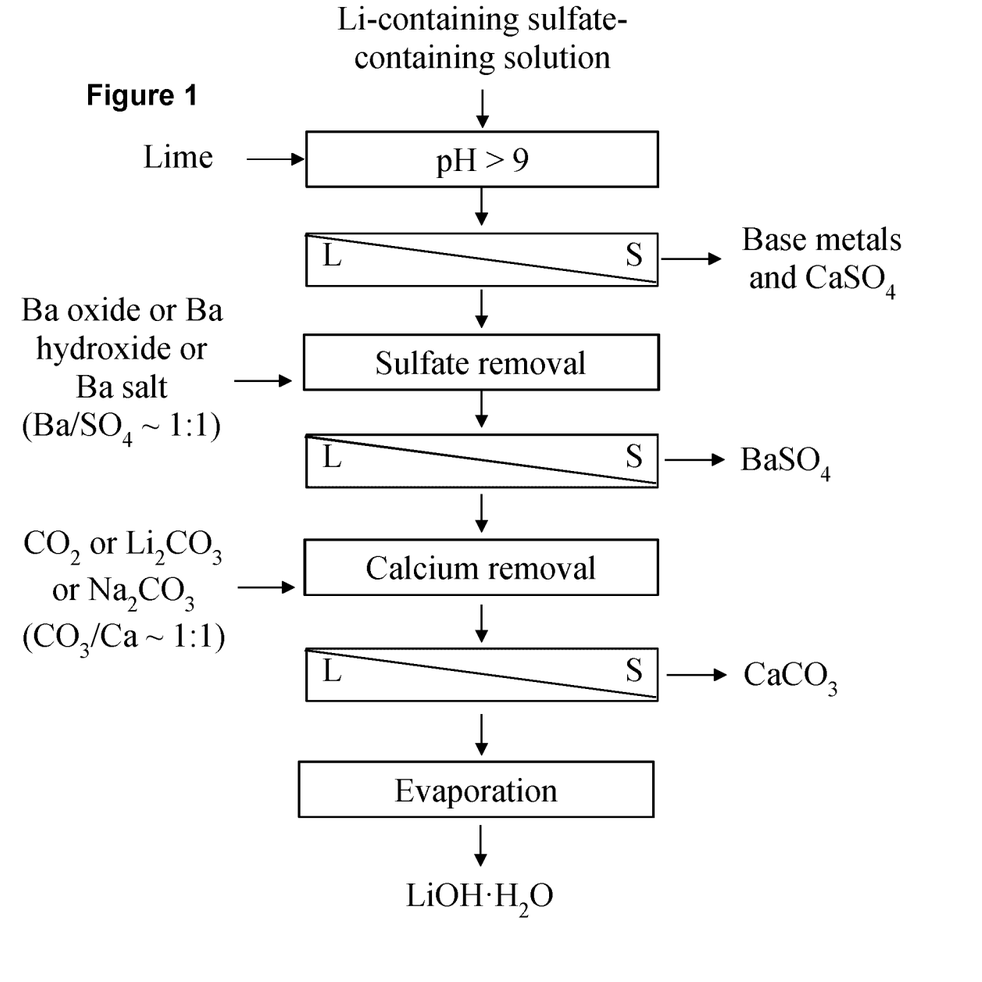
FIG. 1 shows a flow chart setting forth a process for the recovery of lithium as LiOH. $H_2O$ from an $Li_2SO_4$ containing solution, according to an embodiment of the present disclosure.

Example 2: LiOH·$H_2O$ Crystallization from Lithium Sulfate Solution with 5 g/L Lithium This test investigates the LiOH·$H_2O$ crystallization from lithium sulfate solution with 5 g/L lithium. The initial pH of the Li solution was adjusted to 2 with sulfuric acid. FIG. 1 outlines the major steps involved in the precipitation of sulfate and crystallized LiOH·$H_2O$. The experimental and results are shown in Table 2.

TABLE 2

Experimental conditions and results

| Original solution | | pH (After adding lime) | $SO_4$ Conc. (After adding lime) | Ca Conc. (After adding $Ba(OH)_2$) | Li mass percent as LiOH•$H_2O$ (After evaporation) |
|---|---|---|---|---|---|
| Li Conc. | pH | | | | |
| 4.89 g/L | 2.1 | 11.2 | 0.583 g/L | 0.147 g/L | 14.97% |

Example 3: Effects of Various Parameters on Lithium Recovery

This study investigates the conditions for: (a) recovery of lithium with various concentrate of Ba(Ba/$SO_4$ molar ratio: 80-120%), Na (0-30 g/L), Li (5-15 g/L); (b) pH from 6 to 10; (c) temperature from 5-60° C., time from 0-120 min.

$Ba(OH)_2$ or BaO was first dissolved in to 50 ml distilled water to make $Ba(OH)_2$ slurry. Then, the slurry was added to 100 ml of $Li_2SO_4$ solution, drop by drop (10 ml slurry/10 min), and further reacted for 2 hours, followed by filtration. Taking one sample every 50 min.

Figure 2:
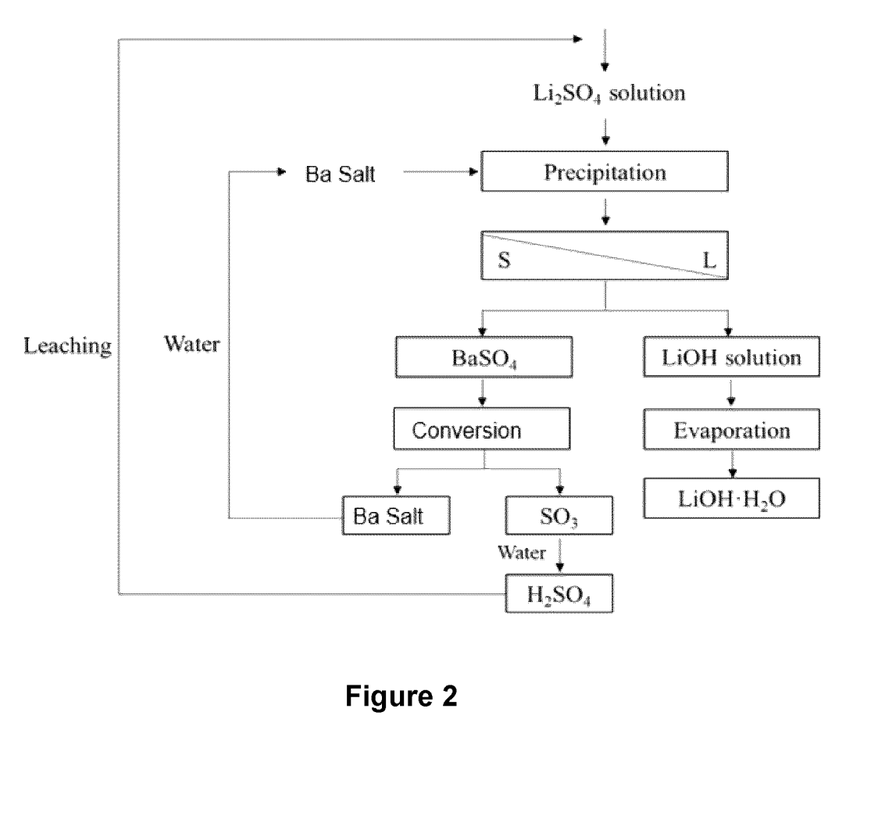
FIG. 2 shows a flow chart setting forth a process for the recovery of lithium as LiOH·$H_2O$ from an $Li_2SO_4$ containing solution, further showing recycling of $Ba(OH)_2$ and $H_2SO_4$, according to an embodiment of the present disclosure.

FIG. 2 further shows regeneration of $Ba(OH)_2$ and $H_2SO_4$. As can be seen, $BaSO_4$ obtained after Stage 3 is calcinated at a temperature between about 600-800° C. BaO and $SO_3$ are formed. BaO is treated with water yielding $Ba(OH)_2$ which is recycled for use in the process at Stage 3. $SO_3$ is also treated with water, yielding $H_2SO_4$ which is recycled for use to regenerate metal sulphates (including $Li_2SO_4$).

Figure 3:
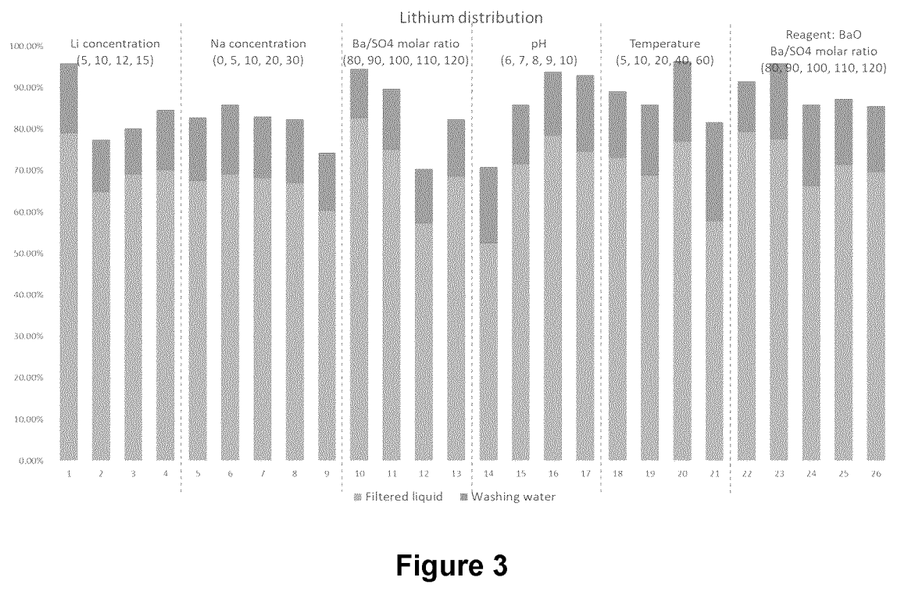
FIG. 3 shows graphical results of the values of the distribution of lithium shown in Table 3, with the lower portion of the bars corresponding to the filtrate and the upper portion of the bars corresponding to the wash water.
Figure 4:
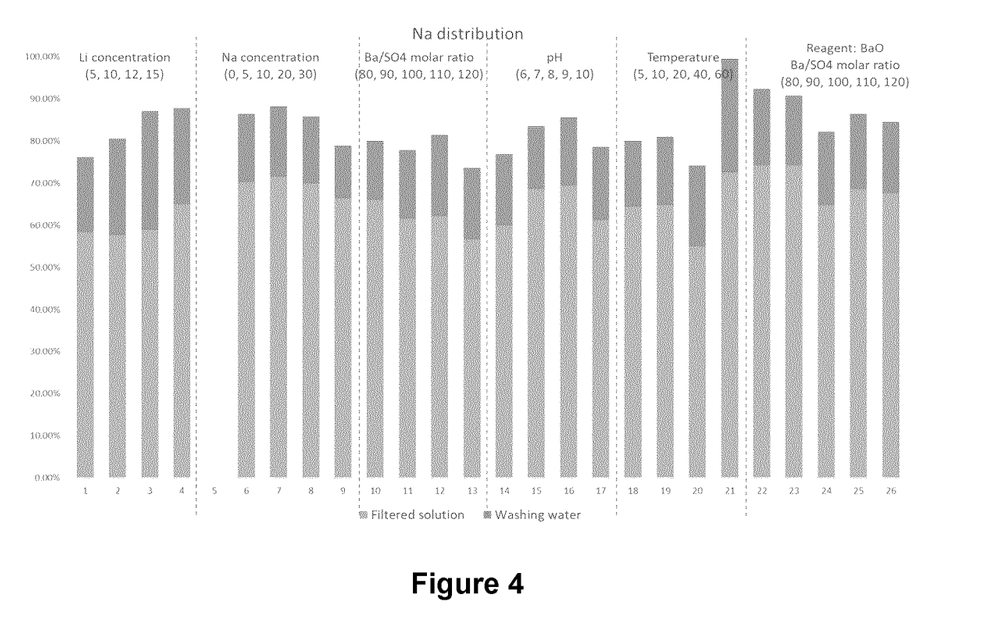
FIG. 4 shows graphical results of the values of the distribution of sodium shown in Table 3, with the lower portion of the bars corresponding to the filtrate and the upper portion of the bars corresponding to the wash water.

The conditions of the various experiments conducted and mass balance are shown in Table 3. FIG. 2 outlines the major steps involved in the precipitation of lithium and crystallized LiOH·$H_2O$. FIG. 3 shows in graphical form the values of the distribution of lithium shown in Table 3, with the lower portion of the bars corresponding to the filtrate and the upper portion of the bars corresponding to the wash water. FIG. 4 shows in graphical form the values of the distribution of sodium shown in Table 3, with the lower portion of the bars corresponding to the filtrate and the upper portion of the bars corresponding to the wash water. The presence of lithium and sodium in the washing water may be because the vacuum pump is not used to facilitate the separation of solid and liquid. After filtration, some liquid remained in the solid. When the solid was washed by distilled water, the residual liquid got into the washing water, resulting in a higher concentration of lithium and sodium in the washing water.

TABLE 3

Experimental conditions and results

| NO. | Reagent | Li Conc. (g/L) | Na Conc. (g/L) | Ba/SO₄ molar ratio | pH | Temp. (° C.) | Li distribution Filtered liquid | Li distribution Washing water | Li distribution Solid | Na distribution Filtered liquid | Na distribution Washing water | Na distribution Solid | Ba Solid | SO₄ Solid |
|---|---|---|---|---|---|---|---|---|---|---|---|---|---|---|
| 1 | Ba(OH)₂ | 5 | 1 | 100% | 9 | 20 | 79.13% | 16.80% | 0 | 58.51% | 17.7% | 0 | 94.85% | 94.80% |
| 2 | | 10 | | | | | 64.86% | 12.59% | 0 | 57.83% | 22.78% | 0 | 93.86% | 93.81% |
| 3 | | 12 | | | | | 69.13% | 11.05% | 0 | 58.88% | 28.20% | 0 | 98.39% | 98.35% |
| 4 | | 15 | | | | | 70.10% | 14.61% | 0 | 65.02% | 22.77% | 0 | 94.05% | 94.01% |
| 5 | | 5 | 0 | 100% | 9 | 20 | 67.52% | 15.39% | 0 | 0 | 0 | 0 | 94.55% | 94.51% |
| 6 | | | 5 | | | | 69.14% | 16.82% | 0 | 70.38% | 16.05% | 0 | 87.33% | 87.29% |
| 7 | | | 10 | | | | 68.03% | 15.05% | 0 | 71.57% | 16.67% | 0 | 92.07% | 92.03% |
| 8 | | | 20 | | | | 67.04% | 15.33% | 0 | 69.99% | 15.91% | 0 | 95.53% | 95.48% |
| 9 | | | 30 | | | | 60.24% | 14.18% | 0 | 66.5% | 12.38% | 0 | 95.51% | 95.46% |
| 10 | | 5 | 1 | 80% | 9 | 20 | 82.77% | 11.76% | 0 | 66.01% | 14.11% | 0 | 97.71% | 78.13% |
| 11 | | | | 90% | | | 75.05% | 14.70% | 0 | 61.68% | 16.18% | 0 | 92.53% | 83.24% |
| 12 | | | | 110% | | | 57.26% | 13.24% | 0 | 62.26% | 19.2% | 0 | 89.57% | 98.49% |
| 13 | | | | 120% | | | 68.63% | 13.81% | 0 | 56.76% | 16.89% | 0 | 83.88% | 99.62% |
| 14 | | 5 | 1 | 100% | 6 | 20 | 52.50% | 18.46% | 0 | 60.04% | 16.88% | 0 | 94.57% | 94.53% |
| 15 | | | | | 7 | | 71.62% | 14.37% | 0 | 68.75% | 14.87% | 0 | 93.31% | 93.27% |
| 16 | | | | | 8 | | 78.53% | 15.31% | 0 | 69.49% | 16.11% | 0 | 95.2% | 95.16% |
| 17 | | | | | 10 | | 74.59% | 18.43% | 0 | 61.3% | 17.36% | 0 | 99.36% | 99.31% |
| 18 | | 5 | 1 | 100% | 9 | 5 | 73.20% | 15.95% | 0 | 64.46% | 15.68% | 0 | 93.65% | 93.61% |
| 19 | | | | | | 10 | 68.89% | 17.02% | 0 | 64.86% | 16.19% | 0 | 94.56% | 94.52% |
| 20 | | | | | | 40 | 77.05% | 19.33% | 0 | 54.99% | 19.24% | 0 | 91.86% | 91.82% |
| 21 | | | | | | 60 | 57.91% | 23.75% | 0 | 72.58% | 26.97% | 0 | 92.76% | 92.72% |
| 22 | BaO | 5 | 1 | 80% | 9 | 20 | 79.35% | 12.18% | 0 | 74.31% | 18.1% | 0 | 99.27% | 90.11% |
| 23 | | | | 90% | | | 77.55% | 18.38% | 0 | 74.36% | 16.51% | 0 | 96.87% | 87.16% |
| 24 | | | | 100% | | | 66.34% | 19.58% | 0 | 64.93% | 17.32% | 0 | 91.15% | 91.12% |
| 25 | | | | 110% | | | 71.38% | 16.00% | 0 | 68.61% | 17.86% | 0 | 90.08% | 99.07% |
| 26 | | | | 120% | | | 69.68% | 15.91% | 0 | 67.67% | 16.95% | 0 | 84.47% | 99.34% |

Example 4: Al and Fe Removal from Li PLS

A lithium containing material, which was processed to become amenable to sulfuric acid leaching, was leached in sulfuric acid solution with a final pH of about 2.5. The pregnant leach solution (PLS) had 11 g/L lithium, 2.7 g/L aluminum, 300 mg/L iron, and other impurities.

If iron and other cations are in the reduced form then the PLS can be oxygenated or the potential of PLS can be increased by oxygen or other oxidants to oxidize species to more oxidized forms, prior to impurity removal with pH adjustment as oxide and/or hydroxide forms. Alternatively, the PLS can be processed without the oxygenation or oxidation process.

In this example (Example 4) in a series of tests (see Table 4) lime was used as the alkaline material to increase the pH to 3.0 to 6.0 range and remove part of the impurities, mostly including Fe and Al. The process can be carried out in a wide temperature range of ambient T to near boiling temperature. At ambient temperature, increasing the pH of the PLS by the addition of lime slurry or solid fine lime powder had removed above 90% of Al and Fe impurities (Table 4). At pH 4.5 to 5 virtually 100% of iron and aluminum were removed (Table 4). Impurity removal reactions, for simplicity assuming as hydroxide precipitation, are such as:

Al and Fe removal at elevated temperatures of up to near boiling temperature of the PLS (45, 65, 85 and 95° C.) all presented equally acceptable results with above 99.8% of Al and 100% of Fe removal, producing a virtually Fe and Al free solution.

Lime addition ideally can be done as lime slurry, or with solid lime powder, however in our examples the lime slurry with a solid pulp density of 5% presented excellent results, where most of Al and Fe were removed and Li loss to the residue was less than 0.6%, mostly closer to 0.3% or less.

TABLE 4

Tests of Example 4: Al—Fe removal-test duration: 2 h-
Test solutions 750 mL solution per test

| | Parameters | | | Efficiency results | | |
|---|---|---|---|---|---|---|
| Test # | Terminal pH | Lime slurry PD | T (° C) | Al removal (%) | Fe removal (%) | Li loss (%) |
| 1 | 4.5 | 5% | 25 | >97.0 | 100.0 | 1.9 |
| 2 | 4.75 | 5% | 25 | 100.0 | 100.0 | <1.0 |
| 3 | 5 | 5% | 25 | 100.0 | 100.0 | >5.0 |
| 4 | 4.75 | 5% | 45 | >99.5 | 100.0 | 0.3 |
| 5 | 4.75 | 5% | 65 | >99.3 | 100.0 | 0.6 |
| 6 | 4.75 | 5% | 85 | >99.8 | 100.0 | 0.0 |
| 7 | 4.75 | 10% | 65 | >99.9 | 100.0 | >0.5 |

Example 5: Primary Sulfate Removal

The PLS after Al and Fe removal (product of example 4 test) mostly contains Li, sulfate, Mg, Na, and some other base metals such as Ni, Co, etc. The pH of the solution can be increased with lime to remove a large part of the sulfate as well as some other impurities such as Mg. With this process most of, or virtually all of, Ni, Co, Mg will precipitate as oxide/hydroxide, and a proportion of the sulfate in the solution will precipitate as calcium sulfate, likely as gypsum ($CaSO_4 \cdot 2H_2O$).

In our tests (see Table 5, below) the Al—Fe free solution (solution product of Example 4) had about 10 g/L lithium, 600 mg/L Ca, 100 mg/L Mg, and 90 g/L sulfate. Other cations were insignificant or very low.

The solution pH was increased to the range between 9.2 to 12 (lime saturation level) in multiple tests. By increasing pH beyond 9.5 most of Mg and reminder of base metals were precipitated. Lithium loss to solids was low, mostly insignificant. At higher pH of about 11, or higher, near or above 40% of sulfate was removed, reducing the solution sulfate concertation to below 60 g/L. At higher temperatures of 45 to 95° C. the process showed relatively or equally high sulfate removal efficiency.

Likely reactions for sulfate and magnesium removal with lime addition are:

$$Ca^{2+} + SO_4^{2-} + 2H_2O \rightarrow CaSO_4 \cdot 2H_2O$$

$$CaO + MgSO_4 + 2H_2O \rightarrow MgO + CaSO_4 \cdot 2H_2O$$

TABLE 5

Tests of Example 5: primary sulfate removal-test duration: 2 h-Test solutions 400 to 750 mL solution per test

| Parameters | | | Efficiency results | | |
|---|---|---|---|---|---|
| Terminal pH | Lime slurry PD | T (° C.) | Sulfate removal (%) | Mg removal (%) | Li loss (%) |
| 10 | 5% | 25 | 22.0 | 90.0 | 0.0 |
| 10.5 | 5% | 25 | 22.0 | >97.0 | <0.1 |
| 11 | 5% | 25 | >20.0 | >97.0 | 0.0 |
| 11.5 | 5% | 25 | 23.0 | >97.0 | 0.1 |
| 12 | 5% | 25 | 41.0 | >97.0 | 0.0 |
| 12 | 5% | 45 | >32.0 | >97.0 | 0.0 |
| 12 | 5% | 65 | >33.0 | >97.0 | 0.0 |
| 12 | 5% | 85 | >28.0 | >97.0 | 0.0 |

Example 6: Al and Fe Removal and Primary Sulfate Removal in One Step

Adequate lime was added to the PLS of Example 4 in order to increase the pH from acidic pH directly to pH about 12. In this one step process, 100% Al, 100% Fe, >97% Mg, and above 40% of sulfate was removed. No base metals were detected in the solution after the pH adjustment. Thus, the two processes of Example 4 and Example 5 can be combined to one Unit Operation. Though it should be noted that the gypsum produced in Example 5 has high quality and likely a marketable product, however the gypsum of Example 4 and Example 6 are low quality due to the presence of Al and Fe as main impurities.

Example 7: Sulfate Removal with Barium

The product solution of Example 5 (or Example 6) was contacted by different Barium salts to precipitate sulfate of the solution as barium sulfate. Results shown in Table 6. The likely reactions in the process can be:

$$Ba^{2+} + SO_4^{2-} \rightarrow BaSO_4$$

$$BaO + Li_2SO_4 + H_2O \rightarrow BaSO_4 + 2LiOH$$

$$Ba(OH)_2 + Li_2SO_4 \rightarrow BaSO_4 + 2LiOH$$

$$BaCO_3 + Li_2SO_4 \rightarrow BaSO_4 + LiOH + CO_2$$

Barium can be added near Ba:sulfate ratio of stoichiometry (1:1, as shown in the above reactions), to reduce the process cost and increase the sulfate precipitation. Ba can be added as solid salt or slurry, because most of the above Ba salts are soluble in water. Sulfate was efficiently removed at the pH of the solution (i.e. no pH reduction was required) and when Ba was added at the Ba:sulfate ratio of slightly above 1:1, near 1.05:1, virtually all the sulfate of the solution could be removed.

For instance, at solution pH of 11.5 to 12, Ba:sulfate ratio of 1.08 and temperature of 65° C. the addition of $Ba(OH)_2$ salt can effectively remove 100% of the solution sulfate, and the remaining calcium concertation in the solution was reduced by 94.5% to less than 36 mg/L. Magnesium was not detectable in the solution, and Ba concentration was less than 1 mg/L (detection limit). Sodium concentration was near 500 mg/L. A similar test at 25° C. resulted in 98.5% sulfate removal and 93% Ca and 100% Mg removal. With higher dosage of Ba salt one can expect a complete sulfate removal and some leftover Ba in the solution. The lithium loss with barium process (Example 7) was 0% in most of the tests.

TABLE 6

Tests of Example 7: Secondary sulfate removal with Ba salts-test duration: 2 h- Test solutions 400 to 750 mL solution per test

| | Parameters | | | | Efficiency results | | | | |
|---|---|---|---|---|---|---|---|---|---|
| Test # | Terminal pH | Ba salt | Ba to $SO_4$ molar ratio | T (° C.) | Sulfate removal (%) | Ca removal (%) | Mg removal (%) | Na removal (%) | Ba in solution (mg/L) | Li loss (%) |
| 1 | 7 | $Ba(OH)_2$ | 1.00 | 25 | 92.5 | 86.6 | 100.0 | 10.0 | 0.0 | <1.1 |
| 2 | 9 | $Ba(OH)_2$ | 1.00 | 25 | 92.5 | 85.6 | 100.0 | 12.0 | 0.0 | 0.0 |
| 3 | 10.5 | $Ba(OH)_2$ | 1.00 | 25 | 91.0 | 86.4 | 100.0 | 9.0 | 0.0 | 0.0 |
| 4 | 11 | $Ba(OH)_2$ | 1.00 | 25 | 89.9 | 84.5 | 100.0 | 7.0 | 0.0 | 0.0 |
| 5 | 11.5 | $Ba(OH)_2$ | 1.00 | 25 | 89.8 | 82.6 | 100.0 | 9.0 | 0.0 | 0.0 |
| 6 | 11.5 | $Ba(OH)_2$ | 0.95 | 25 | 87.0 | 84.3 | 100.0 | 10.0 | 0.0 | <0.7 |
| 7 | 11.5 | $Ba(OH)_2$ | 0.98 | 25 | 89.1 | 67.9 | 100.0 | 7.0 | 0.0 | 0.0 |
| 8 | 11.5 | $Ba(OH)_2$ | 1.02 | 25 | 94.7 | 87.7 | 100.0 | 8.0 | 0.0 | 0.0 |
| 9 | 11.5 | $Ba(OH)_2$ | 1.05 | 25 | 98.1 | 83.5 | 100.0 | 7.5 | 0.0 | <0.4 |
| 10 | 11.5 | $Ba(OH)_2$ | 1.10 | 25 | 100.0 | 92.8 | 100.0 | 14.4 | 0.0 | <1.1 |
| 11 | 11.5-12.0 | $Ba(OH)_2$ | 1.08 | 25 | 98.5 | 93.0 | 100.0 | 16.6 | 0.0 | 0.0 |
| 12 | 11.5-12.0 | $Ba(OH)_2$ | 1.08 | 45 | 90.4 | 87.3 | 100.0 | 12.7 | 0.0 | 0.0 |
| 13 | 11.5-12.0 | $Ba(OH)_2$ | 1.08 | 65 | 100.0 | 94.5 | 100.0 | 9.7 | 0.0 | 0.0 |
| 14 | 11.5-12.0 | BaO | 1.08 | 25 | 100.0 | 98.1 | 100.0 | 14.4 | 0.0 | 0.0 |
| 15 | 11.5-12.0 | BaCO3 | 1.08 | 25 | 81.8 | 98.3 | 100.0 | 10.1 | 0.0 | 0.0 |

Example 8: LiOH·H$_2$O Crystallization

The solution produced in Example 4 was a high-quality solution with about 10 g/L lithium, about 500 mg/L Na, 30 mg/L Ca; Mg, Fe and Al were under detection limit.

The solution can be treated with ion exchange resins or similar processes to remove the reminder of Ca and Na. Nonetheless, the solution already has high quality thus an alternative option would be to process the solution as is for lithium hydroxide crystallization.

Lithium hydroxide can be crystallized from the solution by removing of water with evaporation at below, near or above boiling temperature of the solution, or treating of the solution under vacuum at temperatures below, near or above boiling temperature of the solution, or a combination of the two. Alternative processes such as the addition of organics to the solution to displace lithium in the solution or other processes can be carried out for lithium hydroxide crystallization.

In our experiments, lithium hydroxide crystallize of the process were identified as lithium hydroxide by XRD, and the samples presented above 16.6% Li as LiOH·H$_2$O.

The present description refers to a number of documents, the content of which is herein incorporated by reference in their entirety.

The scope of the claims should not be limited by the preferred embodiments set forth in the examples, but should be given the broadest interpretation consistent with the description as a whole.

The invention claimed is:

1. A process for recovering a lithium (Li) species from a mixture comprising a lithium species and species of one or more metals other than lithium, comprising:
    treating the mixture with sulfuric acid (H$_2$SO$_4$) to provide a Li$_2$SO$_4$-comprising aqueous solution;
    treating the Li$_2$SO$_4$-comprising aqueous solution with one or more barium salts to form a precipitate comprising barium sulfate (BaSO$_4$);
    treating the solution remaining after BaSO$_4$ precipitation with a carbonate salt to form a precipitate comprising one or more metal carbonates of the one or more metals other than lithium;
    recovering the lithium species from the solution remaining after precipitation of the one or more metal carbonates in the form of lithium hydroxide (LiOH) or a hydrate thereof, via heat treatment and crystallization.

2. The process of claim 1, further comprising:
    treating the Li$_2$SO$_4$-comprising aqueous solution with one or more calcium salts to form a precipitate comprising calcium sulfate (CaSO$_4$);
    wherein the solution remaining after CaSO$_4$ precipitation is treated with the one or more barium salts to form the precipitate comprising BaSO$_4$.

3. The process of claim 1, wherein the mixture is obtained from a natural source comprising lithium species.

4. The process of claim 1, wherein the mixture is obtained from a synthetic or non-natural source comprising lithium species.

5. The process of claim 3, wherein the natural source is an ore, clay, brine or other mineral deposit.

6. The process of claim 5, wherein the ore or clay comprises lepidolite, hectorite, jaderite, spodumene, petalite and/or amblygonite.

7. The process of claim 3, wherein the natural source or mineral deposit comprising lithium species is not a sulfide ore body.

8. The process of claim 5, wherein the brine comprises continental brine, geothermal brine and/or oilfield brine.

9. The process of claim 4, wherein the synthetic or non-natural source comprising lithium species comprises materials produced during recycling of lithium-ion batteries or other lithium bearing materials.

10. The process of claim 9, wherein the materials produced during recycling of lithium-ion batteries comprise lithium-ion battery electrode material.

11. The process of claim 10, wherein the lithium-ion battery electrode material comprises lithium cobalt oxide, lithium manganese oxide, lithium iron phosphate, and/or lithium nickel manganese cobalt oxide.

* * * * *